US008489316B1

(12) United States Patent
Hedges et al.

(10) Patent No.: US 8,489,316 B1
(45) Date of Patent: Jul. 16, 2013

(54) MAP MATCHING METHOD FOR VEHICLE SAFETY WARNING SYSTEM

(75) Inventors: Christopher A. Hedges, Greentown, IN (US); James E. Bormann, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/535,957

(22) Filed: Jun. 28, 2012

(51) Int. Cl.
*G05D 1/02* (2006.01)

(52) U.S. Cl.
USPC .......................................................... 701/300

(58) Field of Classification Search
None
See application file for complete search history.

(56) References Cited

U.S. PATENT DOCUMENTS

| 6,469,664 | B1* | 10/2002 | Michaelson et al. | 342/357.31 |
| 6,734,808 | B1* | 5/2004 | Michaelson et al. | 340/984 |
| 6,750,815 | B2* | 6/2004 | Michaelson et al. | 342/357.31 |

* cited by examiner

*Primary Examiner* — Thomas Tarcza
*Assistant Examiner* — Adam Alharbi
(74) *Attorney, Agent, or Firm* — Lawrence D. Hazelton

(57) ABSTRACT

A map matching method for a vehicle safety warning system (VSWS) is provided. The method includes the steps of a) determining if intelligent transportation system (ITS) map data is available, b) determining a vehicle location and a vehicle heading, c) determining an envelope area around a road feature defined by the ITS map data, d) determining a segment heading for a segment of the road feature, e) determining a separation distance between the vehicle location and the segment if the vehicle location is located within the envelope area, the segment heading is substantially similar to the vehicle heading, and optionally, the segment elevation is substantially similar to the vehicle elevation, and f) map matching the vehicle location to the segment if the separation distance is less than a threshold.

12 Claims, 5 Drawing Sheets

MAP MATCHING METHOD FOR VEHICLE SAFETY WARNING SYSTEM

GOVERNMENT LICENSE RIGHTS STATEMENT

This invention was made with the United States Government support under Contract DTFH61-11-H-00016 awarded by the U.S. Department of Transportation. The Government has certain rights in this invention.

TECHNICAL FIELD OF INVENTION

This disclosure generally relates to a method for map matching a vehicle location to a road network defined by an electronically stored road map, and more particularly to a method for map matching a vehicle location to a road feature defined by an Intelligent Transportation System (ITS) road map for a vehicle safety warning system.

BACKGROUND OF INVENTION

The United States Department of Transportation (USDOT) currently has Intelligent Transportation System (ITS) initiatives underway to develop applications for vehicle-to-infrastructure (V2I) communications for the purposes of improving vehicle safety. Two such applications, Curve Speed Warning (CSW) and Cooperative Intersection Collision Avoidance System for Violations (CICAS-V), utilize ITS road maps broadcasted, typically with limited range, from local road infrastructure to an onboard Vehicle Safety Warning System (VSWS) to provide the location and characteristics of local road features of safety concern. The VSWS utilizes the ITS road map information along with vehicle information, such as vehicle location and vehicle speed, to determine if a safety concern exists that warrants issuing a driver warning.

In order for the VSWS to determine if a safety concern exists, the VSWS must first determine if the vehicle is located on a road feature defined by the ITS road map. Known navigation system map matching methods used in many global positioning system (GPS) navigation systems continuously attempt to map match a vehicle location to a road network defined by a navigation system map. Since there may be many instances when the vehicle location cannot be successfully map matched to a road feature defined by the ITS road map, due to the sparse amount of road network defined by the ITS map (i.e. only road features of safety concern), utilization of known navigation system map matching methods that are configured to continuously map match to a road network will lead to inefficient usage of VSWS computational capacity.

SUMMARY OF THE INVENTION

In accordance with one embodiment, a map matching method for a VSWS is provided. The method includes the step of determining if ITS map data is available. The method also includes the step of determining a vehicle location and a vehicle heading. The method also includes the step of determining an envelope area around a road feature defined by the ITS map data. The method also includes the step of determining a segment heading for a segment of the road feature. The method also includes the step of determining a separation distance between the vehicle location and the segment if the vehicle location is located within the envelope area, the segment heading is substantially similar to the vehicle heading, and optionally, the segment elevation is substantially similar to the vehicle elevation. The method also includes the step of map matching the vehicle location to the segment if the separation distance is less than a threshold.

In another embodiment, a VSWS configured to be installed in a vehicle is provided. The VSWS includes an intelligent transportation system (ITS) map receiver, a global positioning system (GPS) receiver, and a controller. The ITS map receiver is configured to receive ITS map data. The GPS receiver is configured to determine a vehicle location and a vehicle heading. The controller is configured to receive the ITS map data from the ITS map receiver. The controller is also configured to receive the vehicle location and the vehicle heading from the GPS receiver. The controller is also configured to determine an envelope area around a road feature defined by the ITS map data. The controller is also configured to determine a segment heading for a segment of the road feature. The controller is also configured to determine a separation distance between the vehicle location and the segment if the vehicle location is located within the envelope area, the vehicle heading is substantially similar to the segment heading, and optionally, the vehicle elevation is substantially similar to the segment elevation. The controller is also configured to map match the vehicle location to the segment if the separation distance is less than a threshold.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
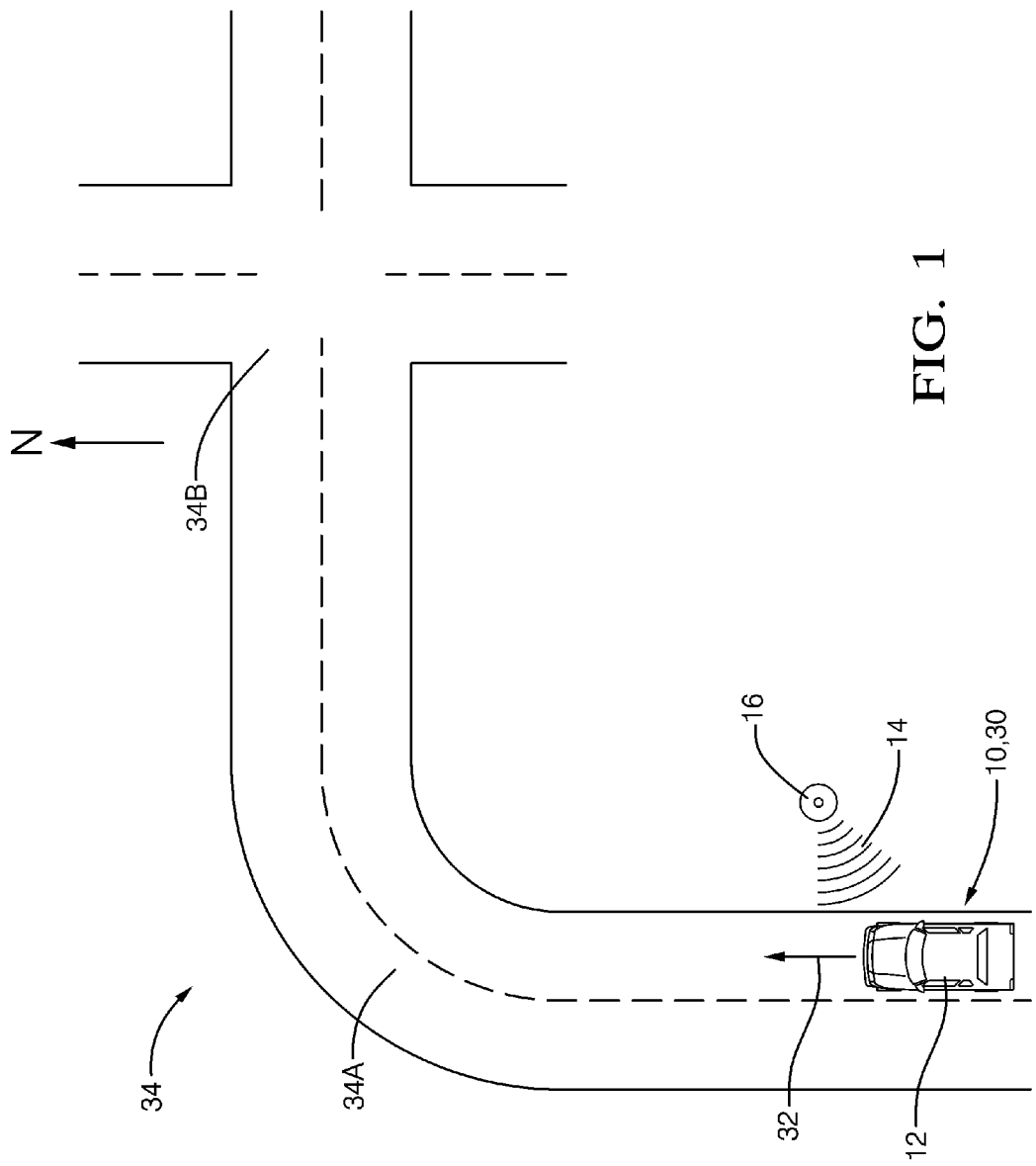
FIG. 1 is a schematic diagram showing an example of a vehicle with an onboard VSWS receiving an ITS map broadcast that contains information pertaining to potentially hazardous local road features.

FIG. 1 illustrates a non-limiting example of a vehicle 10 with an onboard vehicle safety warning system (VSWS) 12 driving within receiving range of an Intelligent Transportation System (ITS) map broadcast 14 being transmitted by a road side transmitter 16. The vehicle 10 has a vehicle location 30 and a vehicle heading 32. The map broadcast 14 contains information pertaining to potentially hazardous local road features 34, such as the location and characteristics of the curve of road feature 34A and the intersection of road feature 34B. The VSWS 12 can utilize the information to determine whether a vehicle safety concern exists that warrants issuing a driver warning. For example, if the vehicle 10 is traveling too fast to safely negotiate the curve of road feature 34A or stop at the intersection of road feature 34B.

Figure 2:
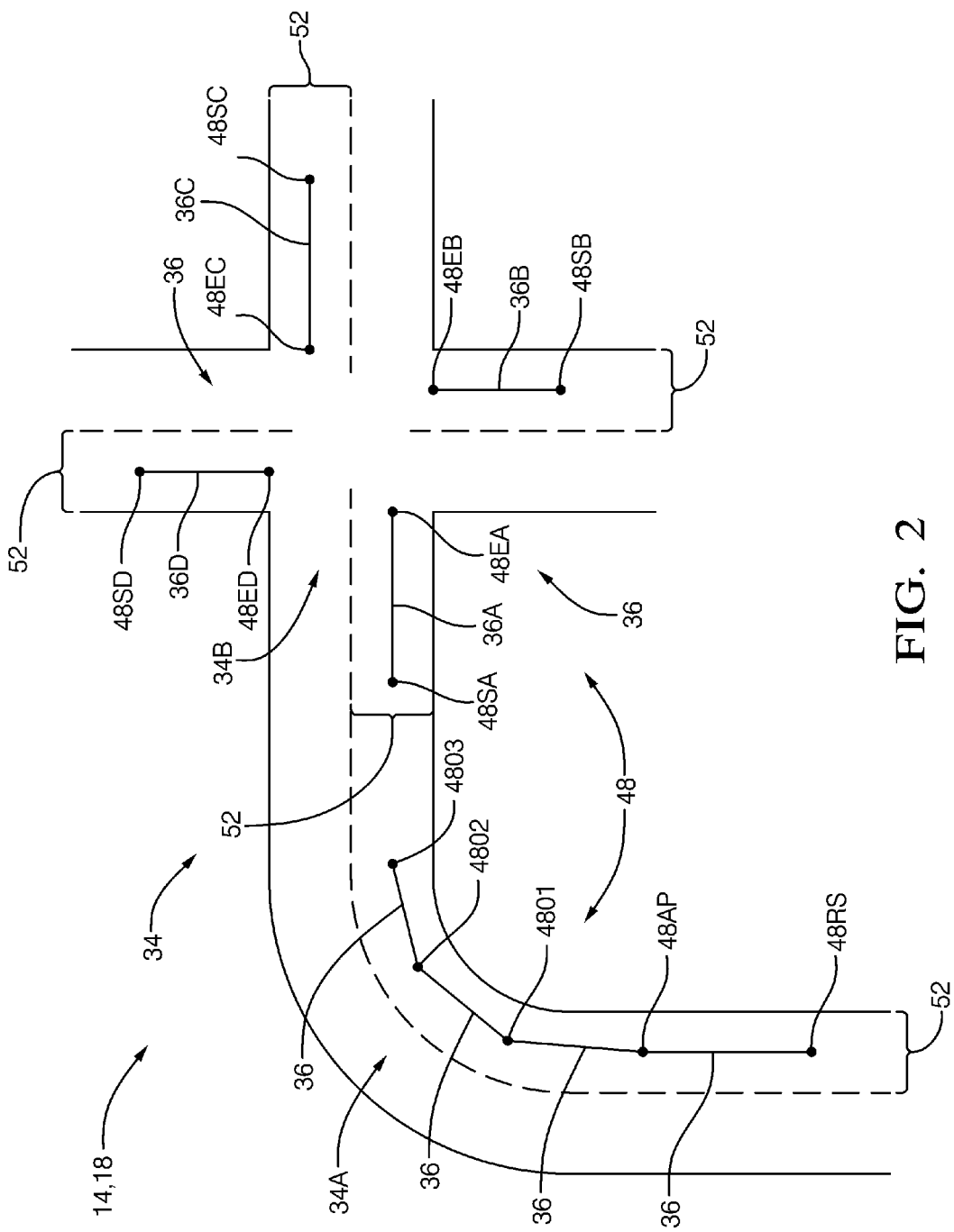
FIG. 2 is a schematic diagram showing an example of the information contained in the ITS map broadcast from FIG. 1.

FIG. 2 illustrates a non-limiting example of the information included in the ITS map broadcast 14, which from now on will be referred to as ITS map data 18. The ITS map data 18 includes location information pertaining to road segments 36 that define the configuration and location of the road features 34. The ITS map data 18 for the road features 34 includes the latitude, longitude and elevation of road segment nodes 48. The road feature 34A is defined with the segment nodes 48RS, 48AP, 48O1, 48O2, and 48O3. Segment node 48RS locates the curve warning starting point with RS denoting "Road Sign" location. Segment node 48AP locates the curve starting point with AP denoting curve "Anchor Point" location. Segment nodes 48O1, 48O2, and 48O3 locate subsequent segment nodes that define the remaining segments that make up road feature 34A with O1 denoting the first "Offset" segment node, O2 denoting the second "Offset" segment node, etc.

The road feature 34B is defined by segment nodes 48SA, 48EA, 48SB, 48EB, 48SC, 48EC, 48SD and 48ED. The segment nodes 48SA and 48EA define the "Starting" and "Ending" location of the segment 36A, and the remaining segment nodes 48SB, 48EB, 48SC, 48EC, 48SD and 48ED do likewise for the segments 36B, 36C, and 36D.

The ITS map data 18 also includes road feature identification (ID) numbers (not shown), segment lane widths 52, and vehicle safety relevant information (not shown) such as recommended maximum travel speeds, traffic light status, traffic light sequencing, etc. for each of the road features 34.

In order for the VSWS 12 to assess whether a safety concern exists, the VSWS must first determine whether the vehicle 10 is located on any of the road features 34 defined by the ITS map data 18. Since vehicle location measurement is not exact and contains measurement error, the VSWS 12 requires a map matching method to determine if the measured vehicle location favorably matches—up with any of the road features 34 whose locations are defined by the ITS map data 18.

Figure 3:
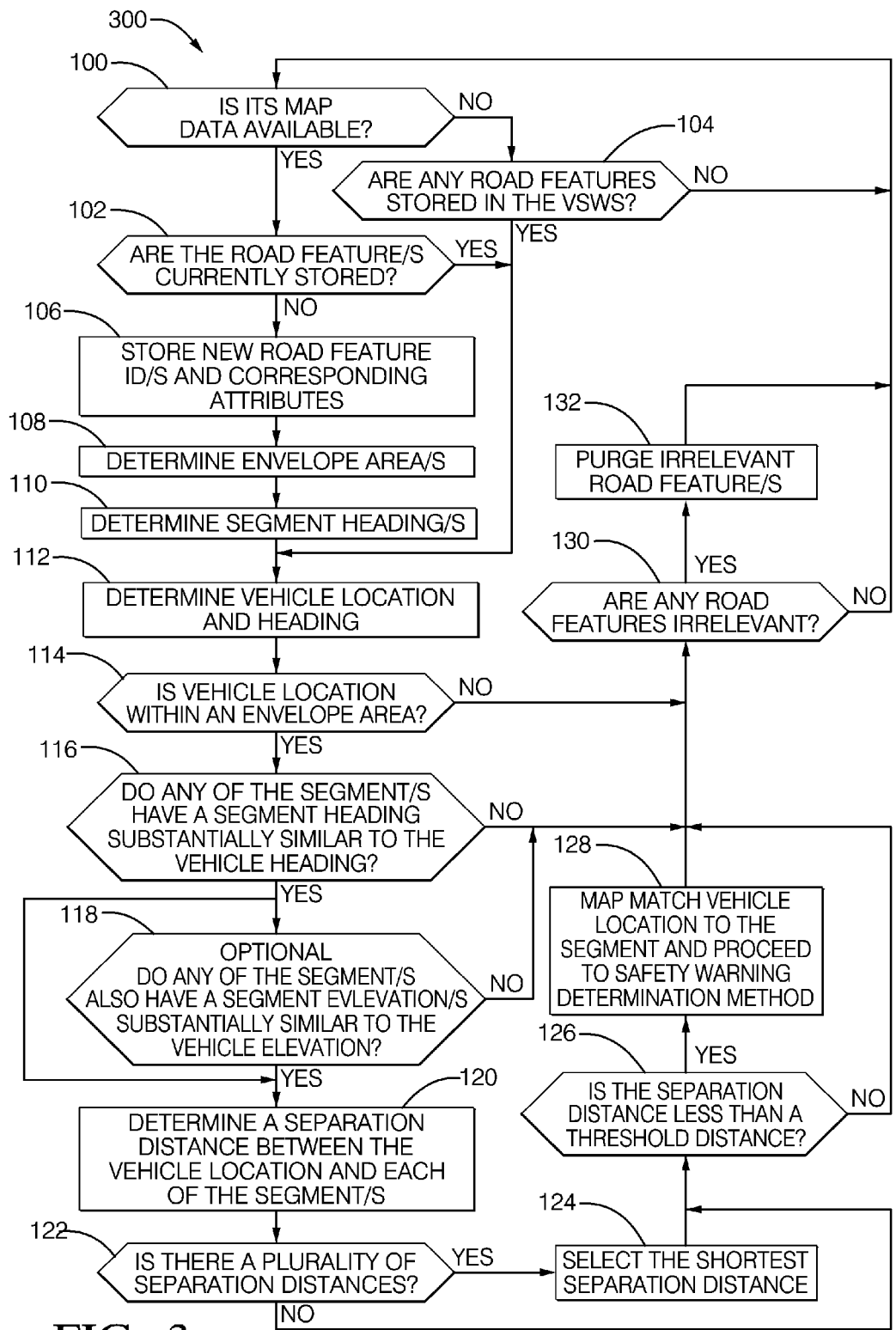
FIG. 3 is a flow chart showing a map matching method for the VSWS of FIG. 1 in accordance with one embodiment.

FIG. 3 illustrates the preferred embodiment of a map matching method 300 for the VSWS 12. It is noted that the map matching method 300 applies to ITS map data comprising one or more road features containing one or more segments. For the purposes of explaining the map matching method 300, it will be assumed that the ITS map data contains multiple roads features made up of multiple segments.

Starting with step 100, the VSWS 12 determines whether ITS map data is available. If no ITS map data is available, the VSWS 12 proceeds to step 104 to determine if any road features received from previous ITS map broadcasts are stored in the VSWS 12. If no road features are stored, the VSWS 12 returns to step 100. If any road features are stored in the VSWS 12, the VSWS proceeds directly to step 112 avoiding processing steps 106, 108, and 110 since there are no new road features to process and store.

If ITS map data is available in step 100, the VSWS 12 proceeds to step 102 to determine if the road features are currently stored in the VSWS. If there are no new road features contained in the ITS map data, the VSWS 12 bypasses processing steps 106, 108, and 110 and proceeds to step 112. If in step 102, the ITS map data 18 includes new road features, the VSWS 12 proceeds to step 106.

In step 106, the VSWS 12 stores the new road feature IDs and corresponding road feature attributes such as segment node locations, maximum driving speed, traffic light sequencing, etc.

Figure 4:
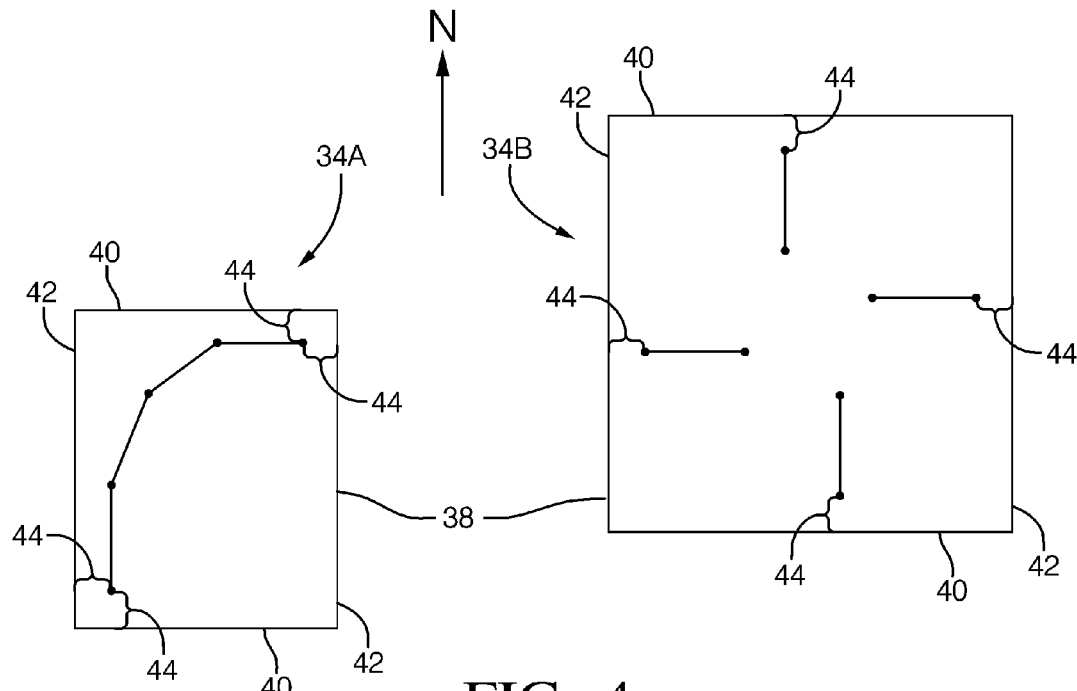
FIG. 4 is a schematic diagram showing an example of envelope areas determined from the information contained in the ITS map broadcast shown in FIG. 2.

In step 108, the VSWS 12 determines envelope areas around the new road features that define the general location of each new road feature, as shown by the non-limiting example in FIG. 4. The envelope areas 38 are determined by forming rectangular areas bounded by latitudinal lines 40 and longitudinal lines 42 that are positioned at distances 44 further north, south, east, or west of the respective northernmost, southernmost, easternmost, and westernmost points of the road features 34. The distances 44 may be established based on one half of the lane width 52 (FIG. 2) of the corresponding segments containing the northernmost, southernmost, easternmost, or westernmost points of the road features 34 plus an additional distance that is equal to vehicle location measurement error.

Figure 5:
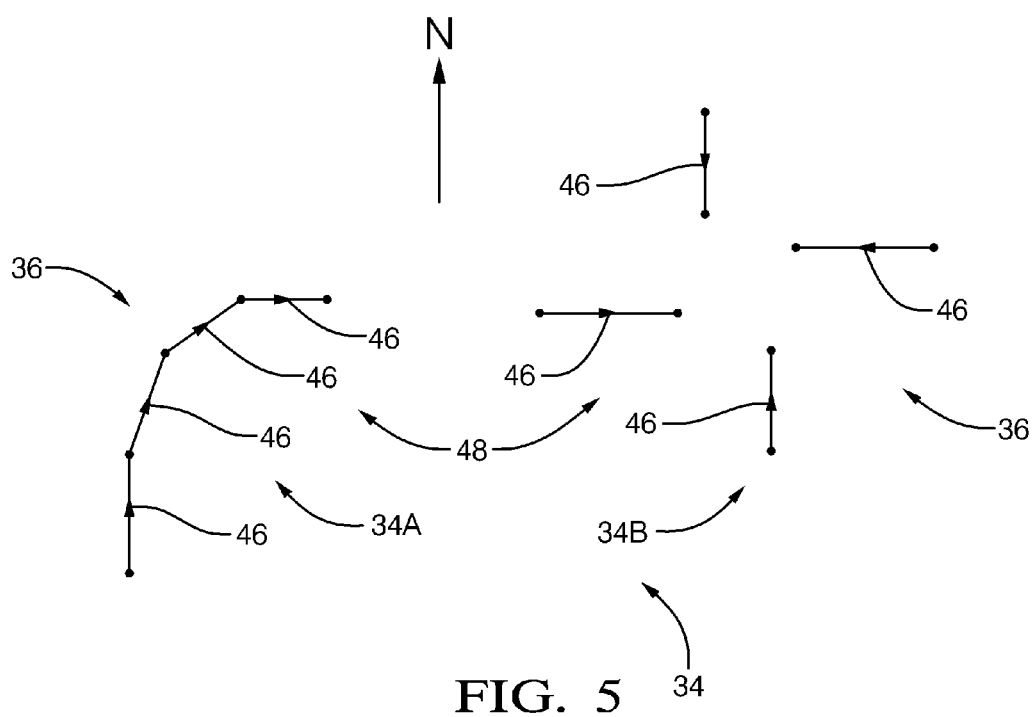
FIG. 5 is a schematic diagram showing an example of road segment headings determined from the information contained in the ITS map broadcast shown in FIG. 2.

In step 110, the VSWS 12 determines segment headings for each of the segments of the new road features, as shown by the non-limiting example in FIG. 5. The segment headings 46 for the segments 36 are determined based on the sequencing and the latitudinal and longitudinal coordinates of the segment nodes 48.

In step 112, the VSWS 12 determines the vehicle location and the vehicle heading. The means for determining the vehicle location and vehicle heading will be discussed in more detail below. The vehicle location contains the latitude, longitude, and elevation of the vehicle 10.

In step 114, the VSWS 12 determines whether the vehicle location is within any of the envelope areas and if so proceeds to step 116. If the VSWS 12 determines the vehicle location is not within any of the envelope areas, the VSWS proceeds directly to step 130 in order to bypass unrequired map matching steps due to the vehicle 10 not being located within the general vicinity of any road features.

In step 116, the VSWS 12 determines if any of the segments within the applicable envelope area have segment headings that are substantially similar to the vehicle heading and if so, proceeds to optional step 118 or to step 120. If none of the segments within the applicable envelope area have a segment heading that is substantially similar to the vehicle heading, the VSWS 12 proceeds to step 130 in order to bypass unrequired map matching steps due to the vehicle 10 not likely being located on any of the segments of the road feature. The terminology "substantially similar to the vehicle heading" used herein means within +/−10 degrees of the vehicle heading.

In optional step 118, the VSWS 12 determines if any of the segments identified in step 116 also have segment elevations that are substantially similar to the vehicle elevation and if so, proceeds to step 120. If none of the segments identified in step 116 have a segment elevation that is substantially similar to the vehicle elevation, the VSWS 12 proceeds to step 130 in order to bypass unrequired map matching steps due to the vehicle 10 not likely being located on any of the segments of the road feature. The terminology "substantially similar to the vehicle elevation" used herein means the elevations of the segment nodes of the segment are within +/−9 meters of the vehicle elevation.

Figure 6:
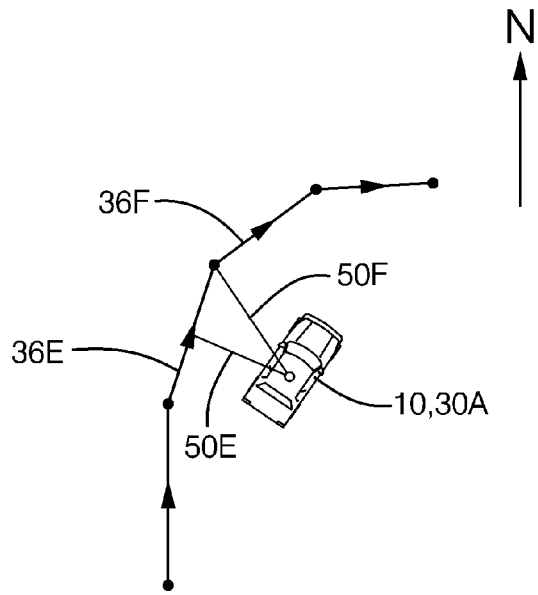
FIG. 6 is a schematic diagram showing an example of multiple separation distances between a vehicle location and road segments shown in FIG. 2.

In step 120, the VSWS 12 determines a separation distance between the vehicle location and each of the segments that have a segment heading that is substantially similar to the vehicle heading (and optionally have a segment elevation that is substantially similar to the vehicle elevation). The separation distance pertaining to each of the applicable segments is determined by calculating the shortest distance separating the vehicle location from the segment, as shown by the non-limiting example in FIG. 6. A separation distance 50E exists between the segment 36E and the vehicle location 30A, and a separation distance 50F exists between the segment 36F and the vehicle location 30A. Mathematical equations for calculating a perpendicular distance to a line segment or the distance between 2 points, such as the vehicle location and a node location, are generally known in the art.

In step 122, the VSWS 12 determines if there is a plurality of separation distances and if so, proceeds to step 124 to select the shortest of the plurality of separation distances. If there is not a plurality of separation distances, the VSWS 12 proceeds directly to step 126.

In step 126, the VSWS 12 determines if the separation distance is less than a threshold distance. The threshold distance may be established based on one half of the lane width of the segment characterized by the separation distance plus an additional distance that is equal to vehicle location measurement error. If the VSWS 12 determines that the separation distance is less than the threshold, the VSWS proceeds to step 128. If the VSWS 12 determines the separation distance is not less than the threshold, the VSWS proceeds to step 130 due to the vehicle 10 not likely being located on the road feature.

In step 128, the VSWS 12 map matches the vehicle location to the segment characterized by the separation distance and proceeds to a safety warning determination process. Note that the safety warning determination process, such as comparing vehicle speed to the recommended maximum speed for a segment and providing a signal to a driver warning indicator, will not be described in detail here and is known in the art.

In step 130, the VSWS 12 determines whether any of the road features stored in the VSWS 12 are irrelevant to the VSWS. A road feature is deemed irrelevant if both the vehicle location is outside of the corresponding envelope area of the road feature, and the vehicle heading is directed away from the corresponding envelope area for a period of time, for example 10 seconds. If the VSWS 12 determines irrelevant road features exist in storage, the VSWS proceeds to step 132 to purge irrelevant road features before proceeding back to step 100 to restart the map matching method 300. If the VSWS 12 determines there are no irrelevant road features in step 130, the VSWS proceeds directly to step 100 to restart the map matching method 300.

Figure 7:
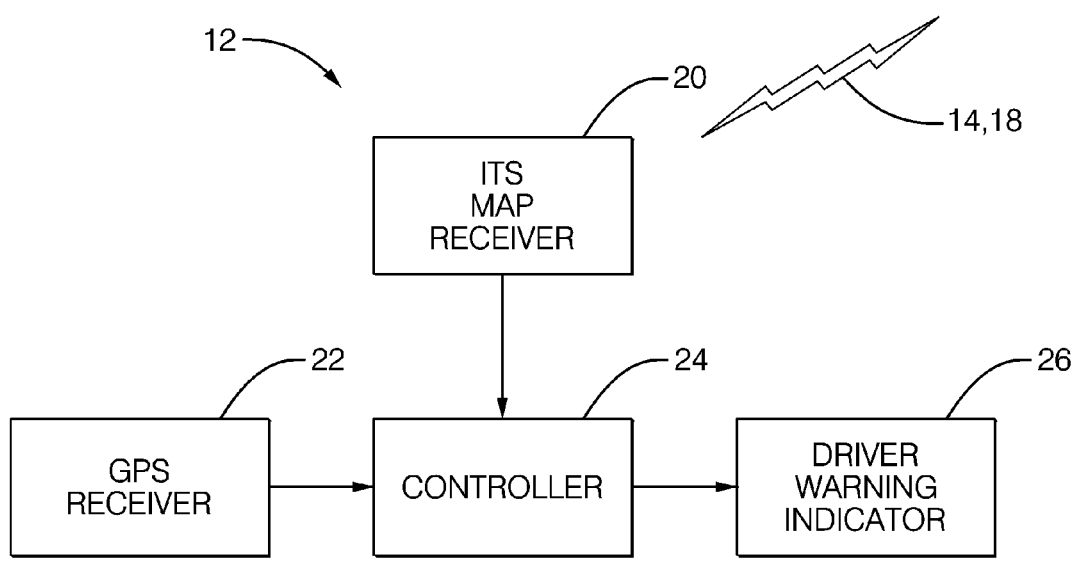
FIG. 7 is a block diagram showing the basic structure of the VSWS of FIG. 1 in accordance with one embodiment.

FIG. 7 illustrates a non-limiting example of the basic structure of the VSWS 12 for implementing the preferred embodiment of the map matching method 300. An ITS map receiver 20 is configured to receive the ITS map data 18 contained in the ITS map broadcast 14. A global positioning system (GPS) receiver 22 is configured to determine the vehicle location, the vehicle heading, and a vehicle speed. A controller 24 is configured to a) receive ITS map data 18 from the ITS map receiver 20, b) receive the vehicle location, vehicle heading, and vehicle speed from the GPS receiver 22, c) execute the preferred embodiment of the map matching method 300 illustrated in FIG. 3., d) determine if a vehicle safety concern exists if the vehicle location is map matched to a segment of a road feature contained in the ITS map data 18 and e) send a signal to a driver warning indicator 26 if a safety concern is determined. The safety warning indicator 26 is configured to receive the signal from the controller 24 and provide a safety warning alert message to the driver when the signal is received.

The controller 24 may include a processor (not shown) such as a microprocessor or other control circuitry as should be evident to those in the art. The controller 24 may include memory (not shown), including non-volatile memory, such as electrically erasable programmable read-only memory (EEPROM) for storing one or more routines, thresholds, and captured data. The one or more routines may be executed by the processor to perform the steps of the map matching method 300 described herein.

Accordingly, a map matching method 300 and apparatus for a VSWS 12 are provided. Both the map matching method 300 and VSWS 12 provide means for efficient utilization of VSWS computational capacity by bypassing unnecessary map matching processing steps due to vehicle 10 not being in the vicinity of road features defined by an ITS road map.

We claim:

1. A map matching method for a vehicle safety warning system (VSWS), the method comprising:
   determining if intelligent transportation system (ITS) map data is available;
   determining a vehicle location and a vehicle heading;
   determining an envelope area around a road feature defined by the ITS map data;
   determining a segment heading for a segment of the road feature;
   determining a separation distance between the vehicle location and the segment if the vehicle location is located within the envelope area, the segment heading is substantially similar to the vehicle heading, and optionally, the segment elevation is substantially similar to the vehicle elevation; and
   map matching the vehicle location to the segment if the separation distance is less than a threshold.

2. The map matching method of claim 1, wherein the method further comprises purging the road feature from the VSWS if the road feature is determined to be irrelevant to the VSWS based on the vehicle location, vehicle heading, and a time threshold.

3. The map matching method of claim 1, wherein the method further comprises determining if the road feature is currently stored in the VSWS, and bypassing the steps of determining the envelope area and determining the segment heading if the road feature is currently stored in the VSWS.

4. The map matching method of claim 1, wherein the method further comprises determining if there is a plurality of separation distances and selecting the shortest of the plurality of separation distances.

5. The map matching method of claim 1 wherein the envelope area is determined by forming a rectangular area bounded by latitudinal lines and longitudinal lines that are positioned at distances further north, south, east, or west of the respective northernmost, southernmost, easternmost, and westernmost points of the road feature.

6. The map matching method of claim 5, wherein the distances are determined by combining one half of the lane width of the corresponding segment containing the northernmost, southernmost, easternmost, or westernmost points of the road feature with an additional distance that is equal to vehicle location measurement error.

7. A vehicle safety warning system (VSWS) configured to be installed in a vehicle, said system comprising:
   an intelligent transportation system (ITS) map receiver configured to receive ITS map data;
   a global positioning system (GPS) receiver configured to determine a vehicle location and a vehicle heading;
   a controller configured to a) receive the ITS map data from the ITS map receiver, b) receive the vehicle location and the vehicle heading from the GPS receiver, c) determine an envelope area around a road feature defined by the ITS map data, d) determine a segment heading for a segment of the road feature, e) determine a separation distance between the vehicle location and the segment if the vehicle location is located within the envelope area, the vehicle heading is substantially similar to the segment heading, and optionally, the vehicle elevation is substantially similar to the segment elevation, and f)

map match the vehicle location to the segment if the separation distance is less than a threshold.

8. The VSWS of claim 7, wherein the controller is further configured to purge the road feature from the VSWS if the road feature is determined to be irrelevant to the VSWS based on the vehicle location, vehicle heading, and a time threshold.

9. The VSWS of claim 7, wherein the controller is further configured to determine if the road feature is currently stored in the VSWS and not determine the envelope area and segment heading if the road feature is currently stored in the VSWS.

10. The VSWS of claim 7, wherein the controller is further configured to determine if there is a plurality of separation distances and to select the shortest of the plurality of separation distances.

11. The VSWS of claim 7, wherein the envelope area is determined by forming a rectangular area bounded by latitudinal lines and longitudinal lines that are positioned at distances further north, south, east, or west of the respective northernmost, southernmost, easternmost, and westernmost points of the road feature.

12. The VSWS of claim 11, wherein the distances are determined by combining one half of the lane width of the corresponding segment containing the northernmost, southernmost, easternmost, or westernmost points of the road feature with an additional distance that is equal to vehicle location measurement error.

* * * * *